No. 729,953. PATENTED JUNE 2, 1903.
M. A. MILLS.
REFINING ENGINE FOR PAPER PULP.
APPLICATION FILED APR. 15, 1902.
NO MODEL. 6 SHEETS—SHEET 1.

Fig. 1.

Witnesses
C. H. Walker
G. S. Roy

Inventor.
Melvin A. Mills,
By
Attorney.

No. 729,953. PATENTED JUNE 2, 1903.
M. A. MILLS.
REFINING ENGINE FOR PAPER PULP.
APPLICATION FILED APR. 15, 1902.
NO MODEL. 6 SHEETS—SHEET 2.

Witnesses
C. H. Walker.
G. S. Roy.

Inventor.
Melvin A. Mills,
By
Attorney

No. 729,953. PATENTED JUNE 2, 1903.
M. A. MILLS.
REFINING ENGINE FOR PAPER PULP.
APPLICATION FILED APR. 15, 1902.
NO MODEL. 6 SHEETS—SHEET 4.

Witnesses
C. H. Walker
G. S. Roy

Inventor.
Melvin A. Mills,
By S. F. Holhaus Jr.
Attorney

No. 729,953. PATENTED JUNE 2, 1903.
M. A. MILLS.
REFINING ENGINE FOR PAPER PULP.
APPLICATION FILED APR. 15, 1902.
NO MODEL. 6 SHEETS—SHEET 5.

No. 729,953. PATENTED JUNE 2, 1903.
M. A. MILLS.
REFINING ENGINE FOR PAPER PULP.
APPLICATION FILED APR. 15, 1902.
NO MODEL. 6 SHEETS—SHEET 6.

Witnesses
Inventor
Melvin A. Mills,
by S. T. Wolhaupter
Attorney.

No. 729,953. Patented June 2, 1903.

UNITED STATES PATENT OFFICE.

MELVIN AMBROSE MILLS, OF LAWRENCE, MASSACHUSETTS.

REFINING-ENGINE FOR PAPER-PULP.

SPECIFICATION forming part of Letters Patent No. 729,953, dated June 2, 1903.

Application filed April 15, 1902. Serial No. 103,046. (No model.)

*To all whom it may concern:*

Be it known that I, MELVIN AMBROSE MILLS, a citizen of the United States, residing at Lawrence, in the county of Essex and State of Massachusetts, have invented certain new and useful Improvements in Refining-Engines for Paper-Pulp, of which the following is a specification.

This invention relates to paper-mill machinery, and particularly of the type commonly known in the art, especially among paper manufacturers, as "Jordan" or "refining" engines. Machines or engines of this class provide for a treatment of the paper stuff or pulp usually just before it passes to the paper-making machine and secures such a grinding or maceration thereof as to place the same in the best possible condition for the making of the paper.

Other purposes and advantages of Jordan or refining engines are quite familiar to those versed in the art, and while all of these purposes and advantages are preserved by the present invention still a special object of the latter is to effect a general improvement of the entire machine in order to increase its efficiency besides overcoming some of the objectionable features incident to the use thereof.

As is well known, a Jordan or refining engine for paper-pulp is usually quite heavy, besides being of comparatively large size and requiring a considerable amount of power to run the same effectively. It is one of the primary objects of the present invention to provide an improved construction of refining or Jordan engine involving a distinct improvement in each of the particulars specified without affecting the utility of the machine in either its treatment of the stock or in its capacity to handle the same quantity as the larger-sized machines now in general use.

To this end the invention has in view certain important improvements which permit of the engine being made of a comparatively small size, much smaller, in fact, than any of the ordinary types of Jordan or refining engines now on the market. While providing for an engine of a minimum size, the invention at the same time comprehends a structure capable of being operated with a much less expenditure of power than ordinarily, and yet without sacrificing any of its capacity or proper refining action upon the stock.

Among other objects in view is to provide a novel arrangement of bearings which not only provide for the running of the engine with a minimum amount of friction, but at the same time permitting of the endwise movement or adjustment of the plug-shaft. In this connection the invention also contemplates a distinct and important improvement in the mounting of the driving gear or pulley.

In connection with the novel mounting of the driving gear or pulley the invention has in view the employment of a bearing-hanger for the pulley itself, which bearing-hanger comprises means for holding the pulley to rotation in a fixed plane, or, in other words, relatively stationary with respect to the endwise or longitudinal adjustment of the plug-shaft, thus insuring the keeping of the pulley in line with the belt at all times and under all adjustments of the machine.

A further object of the bearing-hanger for the pulley is to provide means for entirely relieving the same from friction incident to a side pressure or thrust in either direction. In other words, the invention contemplates a thrust-bearing mounting for the driving-pulley itself which provides for the proper support or mounting of the pulley for rotation in a fixed plane without employment of quills, sleeves, or equivalent mountings, such as have heretofore been resorted to in the mounting of the driving-gear for a Jordan engine wherein the pulley was relatively fixed or stationary.

Another object of the invention is to provide an improvement in the mounting of the driving-gear wherein a bearing is dispensed with between the pulley and the adjacent end of the Jordan shell and an adjustable bearing-stand is employed which permits the belt to be drawn from any direction, so that the engine may be adapted to any space or belting, while at the same time the belt may be removed without cutting or unlacing the same or without disturbing the mounting of the driving-pulley.

The invention also has for its object an improvement in the formation of the plug to present less obstruction to the forward movement of the stock, while at the same time insuring a more perfect and constant balancing than is possible with the old type of hollow Jordan plugs.

A still further object resides in novel means for effecting the endwise or longitudinal adjustment of the plug and in the general formation of the engine which permits of the employment of a short base.

With these and many other objects in view, which will more readily appear as the nature of the invention is better understood, the same consists in the novel construction, combination, and arrangement of parts to be hereinafter more fully described, illustrated, and claimed.

The essential features of the invention are necessarily susceptible to a wide range of modification from a structural standpoint; but a few of the preferred embodiments thereof are shown in the accompanying drawings, in which—

Like reference characters designate corresponding parts throughout the several figures of the drawings.

In carrying out the present invention the general form of the ordinary type of refining or Jordan engine is preserved; but the important and distinctive differences reside in the construction and arrangement of parts which permit of the engine being made much smaller than usual and requiring less power to run the same without sacrificing any of its efficiency either in its refining action or as to capacity. Consequently the approved form of Jordan or refining engine may be preserved in utilizing the improvements contemplated by the present invention, though it should be understood that these improvements are equally applicable to any preferred or practical shape or design of shell and plug. However, for illustrative purposes it has been deemed preferable to show the distinctive improvements contemplated by the invention in connection with a Jordan shell and a plug of the type disclosed in my former patent, No. 481,605, and also in my pending application, Serial No. 57,080, filed April 23, 1901. Specific reference to the improvements will therefore be made in connection with the form of Jordan shell and plug shown in the drawings.

Referring particularly to the drawings, the numeral 1 designates the exterior tapering shell of the engine. This tapering shell is substantially of a frusto-conical form and in the present invention is designed to be made of materially less diameter and length than the shells of the larger-sized Jordans now in use. However, no substantial change need be made in the "filling" of either the shell or the rotating plug 2, working therein. In the drawings the shell 1 is illustrated as being provided upon its interior surface with a series of longitudinally-arranged knives or blades 3, with which coöperate the similarly-arranged knives or blades 4, carried by the rotating plug 2. The knives or blades 4, carried on the periphery of the rotating plug 2, work in proximal relation to the opposing edges of the stationary knives or blades 3, fitted to and within the shell 1 to effect a grinding or maceration of the pulp as it passes through the machine, thus securing the refining action which is contemplated by a Jordan or refining engine. The rotating plug 2 is also of tapering or conical form corresponding to the configuration of the shell within which it works, but is necessarily smaller in diameter than the shell to provide an intervening working space between the exterior of the plug and the inner wall of the shell, which space is practically occupied by the complemental and opposing knives of both the shell and the plug in order that the proper refining action may be carried out.

The tapered or conical shell 1 is preferably formed at the feed or receiving end thereof with an annular chamber 5, which is either an integral part of the shell or separably attached thereto; but irrespective of the formation of the said chamber 5 at the receiving end of the engine the same provides an annular enlargement at such end to form a refuse chamber or trap for the collection and disposal of such substances, as nails and the like, which frequently flow with the pulp into the engine and are liable to damage the knives on the plug or its inclosing shell. The said annular chamber or trap 5 at the receiving end of the engine also has usually extended therefrom a pendent auxiliary trap or pocket 6, into which the foreign substances fall from the chamber 5 and may be readily removed from time to time through a suitably-covered opening or openings formed in the side or sides or the said trap or pocket.

At the same end as the annular trap or chamber 5 the shell of the engine is also provided with the receiving-hopper 7 for the paper pulp or stuff to be treated, and in carrying out the present invention the end wall of the shell at the receiving end of the engine (which wall may be either separate or an integral part of the shell) is provided with a flanged opening 8, surrounded by an exterior annular supporting-flange 9, which will be hereinafter more fully referred to in connection with the mounting of the different elements of the driving-gear at the driven end of the plug-shaft.

At the end opposite the wall having the flanged opening 8 the shell 1 has bolted or otherwise suitably fitted thereto an offset chambered head 10, which is offset from the wide end of the shell beyond the correspondingly wide end of the plug to constitute a discharge or delivery chamber which permits of the ready discharge of the refined paper-stuff through the outlet pipe or opening 11 in communication with the interior chamber of the said head 10. The latter is also preferably equipped with a central stuffing-box 12 for receiving the portion of the plug-shaft 13 which projects through and beyond the discharging end of the engine.

The body of the shell is designed to be supported horizontally over any suitable base B through the medium of suitable supporting standards or uprights 14, arising from the base and having the shell resting on and secured thereto in any of the approved ways common to the mounting of Jordan or refining engines. These details are not important to the present invention and may be varied in any way without departing from the spirit or scope thereof.

The construction so far described, with the exception of the provision of the flanged opening 8, is in all essential respects substantially the same as disclosed in my former patent and other application aforesaid, and particular reference will now be made to those improvements which are peculiar to the present invention.

In treating the feature of the rotating plug 2 it will of course be understood that the invention contemplates centering the plug in the shell in the ordinary way, while at the same time permitting of an endwise or longitudinal adjustment thereof to compensate for the wear of the knives or blades, as well as to provide for setting the knives of the plug and of the shell as closely as may be desired, according to the particular character of stock being treated. However, in the first place the present invention contemplates making the rotating plug 2 much smaller both as to diameter and length than the ordinary types of plugs now in use, thus admitting of the plug being rotated with a much less expenditure of power, and yet at the same time at a sufficient speed to maintain the full capacity of a Jordan engine of much larger size. This improvement, while relating particularly to the size of the plug, is an important one, but yet is only possible through the medium of associating with the plug the various other improvements contemplated by the invention.

Figure 3:
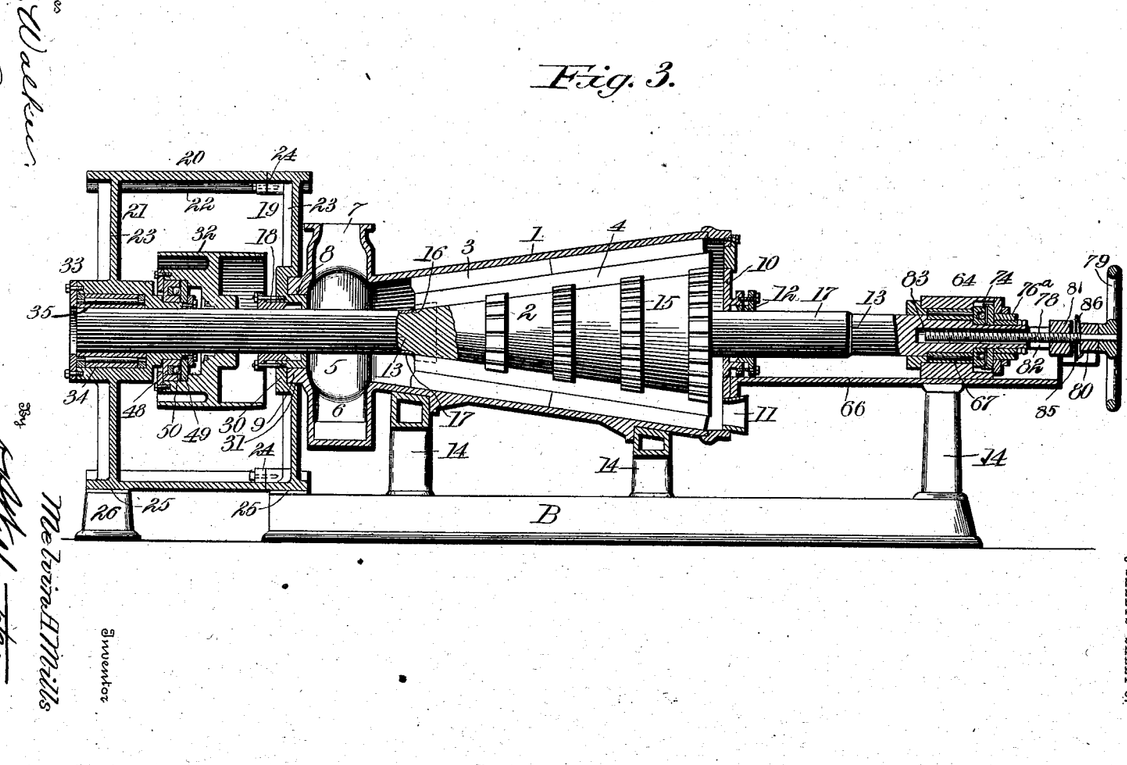
Fig. 3 is a vertical longitudinal sectional view of the entire machine.

A very distinct improvement in the rotating plug of the Jordan resides in the fact that it is the purpose of the present invention to form said plug of a solid casting or forging, as plainly shown in Fig. 3 of the drawings. The solid plug-casting may be either cast on or with the shaft 13; but in either event the advantage is derived of having a rotating plug which will always remain in perfect balance. Heretofore it has been customary to form the plugs of hollow castings; but these hollow castings are open to the objection of leaking and becoming partially filled with stock and water, which necessarily have the tendency to throw the plug out of balance. This of course is very undesirable in machinery of this character, and a solid plug-casting obviates the difficulty.

In the construction of the plug 2 the same is formed upon its periphery with a succession of annular holding-collars 15, suitably grooved or notched to receive the knives or blades 4, and these holding-collars preferably constitute an integral part of the plug-casting, and in connection with the latter it should further be observed that at its smaller end the conical or tapering plug 2 is provided with a contracted guiding-incline 16, which merges on curved lines directly into the contiguous portion of the plug-shaft 13, thus entirely eliminating the feature of an abutment, shoulder, or obstruction at the smaller end of the Jordan plug.

In the ordinary types of Jordan engines there is usually a well-defined and distinct shoulder or head at the smaller end of the plug, which necessarily presents an obstruction, more or less to the ready flow of pulp as it passes from the receiving-chamber of the shell into the working space occupied by the knives 3 and 4. The guiding-incline 16 offers no such obstruction to the ingoing stock and permits the latter to easily and uniformly flow into and through the working space occupied by the knives, respectively, of the rotating plug and the stationary shell.

The plug-shaft 13 projects from both ends of the solid plug-casting and extends through and beyond the opposite ends of the stationary shell 1 in the usual manner to provide for holding the plug properly centered within its shell and at the same time permitting of the direct application of power to the shaft, also to permit of the convenient longitudinal or endwise adjustment thereof to effect the proper adjustment of the plug. It is preferable in the carrying out of the invention to fit over the opposite portions of the plug-shaft, respectively, beyond the opposite ends of the plug protective brass or equivalent shaft-sleeves 17. They provide better bearing-surfaces for the shaft, especially at the points where the same projects through the end walls of the shell, while also protecting the shaft portions from the corrosive influences of the liquid mass being treated in the engine. The said brass or equivalent shaft-sleeves 17 may be shrunk or otherwise suitably fitted on the separate shaft portions without affecting the invention, as the use of said sleeves is optional with the manufacturer of the engine, although it is preferable to employ the same in the construction of an engine of the type contemplated by the present invention.

At the driven end of the machine or engine the plug-shaft 13 extends through and beyond the stuffing-box 18, carried by the inner side member 19 of the rotatable or circularly-adjustable belt-accommodating bearing-stand 20, said stuffing-box being of the conventional construction, but preferably constituting a part of the rotatable or adjustable bearing-stand 20 and registering within the stuffing-box opening 8, formed in the adjacent end wall of the plug-shell 1.

The stuffing-box 18 is only one of the structural details of the bearing-stand 20, as the latter performs several important and useful functions in the carrying out of the present invention. The said bearing-stand is usually and preferably in the form of a circular skeleton frame, essentially consisting of the oppositely-arranged inner and outer side members 19 and 21, respectively, and a plurality of substantially horizontal cross-bars 22, connecting the inner and outer side members 19 and 21 at intervals, thus forming the general frame of the stand.

By reason of the skeleton construction of the open bearing-stand 20 the inner and outer side members 19 and 21 thereof are usually of a spoked formation and consist of a series of radially-disposed frame-arms 23, which are formed integrally with and are connected at their outer extremities by the cross-bars 22, previously referred to. While the inner side frame member 19, through the medium of the cross-bars 22, constitutes a part of the same framework as the outer side member 21, it is preferable in the construction of the bearing-stand to provide a separable or detachable joint connection 24 between the outer ends of the frame-arms 23 of the said inner side member 19 and the contiguous inner end portions of the cross-bars 20, as may be plainly seen from Fig. 3 of the drawings. This separable or detachable joint connection between the inner and outer portions of the frame constituting the bearing-stand facilitates the setting up and taking apart of the machine, as will be readily understood by those familiar with machine-building. However, for the purposes of the present invention it should be understod that the construction described is a complete frame as an entirety and as such is rotatable or circularly adjustable to provide for accommodating the machine to a belt drawn in any direction, as will be presently explained.

The cross-bars 20, which connect the inner and outer members 19 and 21 of the bearing-stand in the manner explained, are preferably curved in cross-section to form saddle-plates, which are designed to individually rest on and register in the stand-seats 25, located at one end of the machine-base. Preferably a pair of the stand-seats 25 are utilized, and in the construction of the machine the main base B is formed with one of said seats at one extremity thereof, while the other seat is formed at the upper side of a separate base-block 26, spaced beyond the contiguous part of the main portion of the base, thus obviating the necessity of running a full solid base clear out to the point where the outer portion of the rotatable or adjustable bearing-stand has a support on one of the stand-seats 25. The stand-seats 25 are curved to correspond to the cross-sectional form of the saddle-plates or cross-bars 20, and the particular saddle-plate or cross-bar which rests on and registers in the horizontally-alined pair of stand-seats 25 is adapted to be held fast to the base by means of the bolts or equivalent fastening elements 27.

In constructing the rotatable or circularly-adjustable bearing-stand 20 one of the important features thereof resides in providing the same with an open side, (designated by the reference-number 28 in the drawings.) This open side of the bearing-stand constitutes a belt-opening or belt-clearance space, which accommodates the driving-belt 29. By reason of the circular adjustment of the bearing-stand it is obvious that the open side, belt-opening, or belt-clearance space 28 may be presented in any of several positions to accommodate the bearing-stand, and therefore the engine, to a driving-belt drawn in any direction. This is of considerable importance in the matter of installing a Jordan or refining engine in a paper-mill where the shafting and belting already occupies permanent positions, inasmuch as by the employment of an adjustable bearing-stand of the character just described the machine can be readily made to accommodate itself to the direction in which the belt is drawn.

Figure 1:
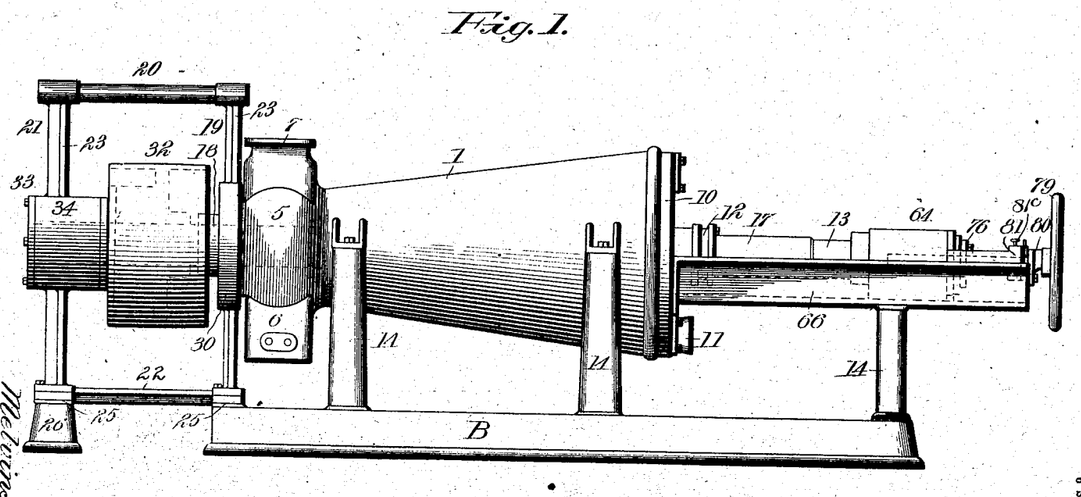
Figure 1 is a side elevation of a refining or Jordan engine constructed in accordance with the present invention.
Figures 2, 10:
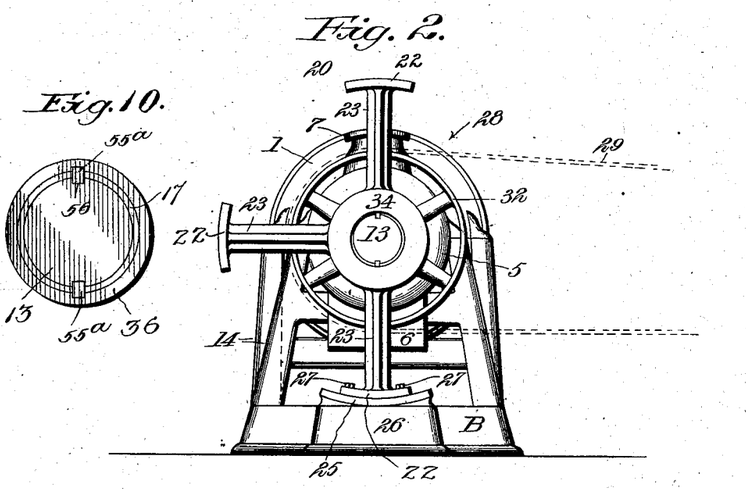
Fig. 2 is an end view of the engine, showing more plainly the mounting of the circularly-adjustable belt-accommodating bearing-stand.
Fig. 10 is a detail end view of the plug-shaft, showing more plainly the keyed or feathered connection thereof with the wear-bushing coöperating with the shaft-bearing at the driven end thereof.

In Fig. 2 of the drawings the open side or belt-opening 28 is illustrated as being presented at one side to accommodate a driving-belt 29, drawn from what might be termed the "right-hand" side of the machine; but should the belt be drawn from a diametrically opposite direction, or from overhead of the machine, it is obvious that it is only necessary to release the fastenings 27 to provide for rotating or turning the bearing-stand upon its axis, so as to bring the belt opening or space 28 into either of the other two positions indicated. After adjustment or setting to accommodate itself to the direction in which the belt is drawn the fastenings 27 are replaced and tightened, so that the bearing-stand constitutes a rigid part of the supporting-framework for the driving-gear as well as for the plug-shaft.

Figure 12:
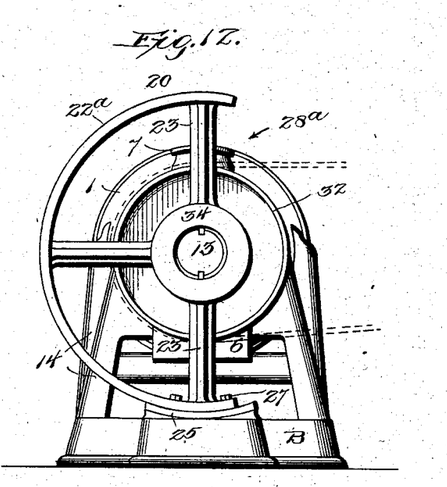
Fig. 12 is an end view similar to Fig. 2, showing a modification in the construction of the circularly-adjustable belt-accommodating bearing-stand.

It is of course understood that only a preferable construction of the adjustable belt-accommodating bearing-stand 20 has been described, as obviously this stand may be constructed in various ways and at the same time carry out the functions already indicated. It is only necessary that the said stand be generally of an open or skeleton formation and circularly adjustable, besides being provided with an open side for the clearance and accommodation of the driving-belt. For instance, one of the various modifications which might be resorted to in the construction of the bearing-stand is suggested in Fig. 12 of the drawings. As shown in this figure of the drawings, instead of connecting the radially-disposed frame-arms by a plurality of individual cross-bars 22, as previously described, which cross-bars constitute separate saddle-plates, the bearing-stand may be constructed with a continuous approximately semicircular rim or shell section 22ᵃ, which extends continuously from arm to arm of the bearing-stand and practically constitutes a continuous semicircular saddle, adapted to be turned in and clamped to the stand-seats 25. By reason of the approximately semicircular formation of the rim or shell section 22ᵃ the latter necessarily provides at one side of the bearing-stand an open side, belt-opening, or belt-clearance space 28ᵃ to accommodate the driving-belt. The construction just described necessarily carries out every function of the preferable construction previously described and emphasizes the variety of modifications that may be resorted to in the formation of the circularly-adjustable belt-accommodating bearing-stand.

Various expedients may be resorted to in the mounting of the bearing-stand 20 to permit of its being rotated or adjusted circularly upon an axis of rotation. A simple and practical means for effecting this mounting is shown in the drawings and consists in providing the inner side member 19 of the bearing-stand with a central journal portion 30, which has a swiveled or pivotal engagement with the adjacent wall of the plug-shaft. The said central journal portion 30, carried by the inner side member 19 of the bearing-stand, comprises the stuffing-box 18, fitting within the end opening 8 of the plug-shaft and a shouldered bearing-collar 31, concentrically arranged with reference to the stuffing-box 18 and loosely interlocking with the supporting-flange 9, surrounding the opening 8, thus completing an interlocked swiveled joint connection between the inner side of the bearing-stand and the adjacent end of the plug-shell, while at the same time providing for the proper support of a stuffing-box at that end of the shell in which the plug-shaft may turn.

The construction described provides a preferable form of swiveled or pivotal joint connection between the inner side of the bearing-stand and the plug-shell; but it is of course obvious that in carrying out the invention this joint may be varied very materially from a mechanical or structural standpoint without departing from the invention, as it is only essential in carrying out the latter that some suitable type of swiveled connection be provided between the inner side of the bearing-stand and the plug-shell to permit of the circular adjustment of the stand upon a horizontal axis.

The bearing-stand, which is circularly adjustable upon a horizontal axis in the manner explained, by reason of having inner and outer side members rigidly united provides an exceptionally strong support and brace for one end of the plug-shell as well as for the driving-gear which is associated with the said stand, and by reason of the novel construction and mounting of the driving-gear the employment of a bearing for the plug-shaft at the inner side of the driving-pulley 32, or, in other words, between said pulley and the adjacent end of the plug-shaft, is entirely dispensed with. Besides dispensing with a bearing at this point for the plug-shaft an improvement is secured by providing a belt-clearance space between the pulley and the adjacent end of the jordan through which the belt may be removed when the plug and plug-shaft are withdrawn from the engine without cutting or unlacing the belt or without removing any other part of the machine, as will be presently more fully apparent from the novel manner of mounting the driving-pulley 32.

In regard to the mounting of the driving-pulley 32 and the portion of the plug-shaft 13 with which the same is directly associated it is to be observed that the outer side member 21 of the bearing-stand 20 is provided with a central terminal bearing 33 for the extreme outer end of the plug-shaft at the driven end of the latter. The said central bearing 33 essentially consists of a tubular bearing-box 34, which is designed to house therein any approved type of antifriction-bearing which will permit of the shaft end running within the bearing-box with a minimum amount of friction, while at the same time admitting of the endwise or longitudinal adjustment thereof. In some forms of the invention the bearing-box 34 is designed to house therein a set of antifriction-roller bearings 35 of any approved construction and preferably coöperating with a wear-bushing 36, fitting over the end of the shaft working within the box 34, and in the employment of antifriction-roller bearings 35 the said bearings may be conveniently held within the chamber or cavity within the bearing-box through the medium of a retaining-ring 37, overhanging the outer side of the bearing-chamber within the box and adjustably secured to the outer side of the box 34 through the medium of bolts or equivalent fastenings 38.

Figure 7:
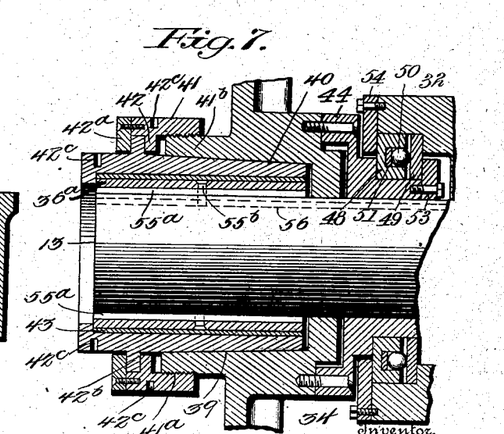
Fig. 7 is a detail sectional view illustrative of a modification which may be resorted to in the character of bearing employed for receiving the outer extremity or terminal of the plug-shaft at the driven end thereof.
Figure 11:
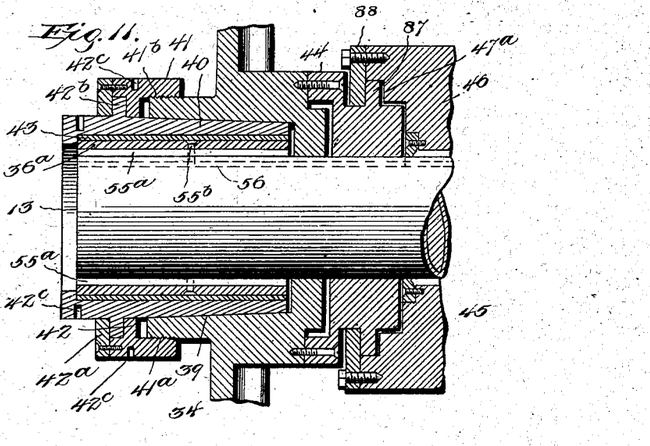
Fig. 11 is a detail sectional view illustrative of another modification that may be resorted to in the mounting or hanging of the pulley upon the bearing-stand or other stationary support.

While antifriction-roller bearings are usually employed in connection with the end of the plug-shaft turning in the bearing-box 34, it is obvious, as already indicated, that any other form of bearing, whether of the antifriction type or not, may be employed for the end of the shaft without affecting the spirit of the invention. For instance, as suggested in the modifications shown in Figs. 7 and 11 of the drawings, a bearing of the babbitted type may be utilized in connection with the bearing-box 34. In this construction the bearing-box would be formed with an interiorly-tapered bore 39, receiving a correspondingly exteriorly-tapered adjustable bearing-bushing 40. This bearing-bushing while held against longitudinal movement or displacement is designed to be so mounted as to permit of its rotation or circular adjustment to present a new babbitted bearing-surface to the shaft and to again centralize the shaft in the shell after wear of the babbitted surface upon which the weight of the shaft has been borne in the rotation thereof. This mounting of the adjustable bearing-bushing 40 may necessarily be accomplished by a variety of mechanical expedients; but a simple construction is shown in Figs. 7 and 11 of the drawings and resides in the employment of an adjustable carrier-ring 41, having an interiorly-threaded portion 41$^a$ engaging the exteriorly-threaded neck 41$^b$ at the outer side or end of the bearing-box 34. The adjustable carrier-ring 41 is also provided with an inwardly-projecting retaining-flange 42 and at its outer end carries a detachable retaining-plate 42$^a$, disposed in parallelism to the flange 42 and serving to confine in the interval therebetween the annular holding collar or flange 42$^b$, constituting a rigid part of the bushing 40 and projecting exteriorly from the outer end portion thereof beyond the neck of the bearing-box 34. Any suitable means may be associated with both the bushing 40 and the adjustable carrying-ring 41 to provide for the turning thereof in the adjustment of the babbitted bearing. One of these expedients is indicated in the drawings and consists in providing the extreme outer end portion of the bushing 40 and also the outer surface of the carrier-ring 41 with a plurality of tool-receiving sockets or holes 42$^c$. Any suitable tool may be inserted in these sockets or holes for turning the members provided therewith.

The bearing-bushing 40 carries the inner babbitted bearing-surface 43, against which rotates the wear-bushing 36$^a$, arranged over the end of the shaft, turning within the bearing-box 34. From the construction described it will be obvious when that portion of the babbitted bearing-surface which sustains the weight of the shaft becomes worn it is only necessary to rotate or turn the adjustable bearing-bushing 40 to provide for presenting to the shaft a new bearing-surface. By reason of the tapered fit of the bearing-bushing 40 within the bearing-box 34 the same may be held tightly therein by screwing up the adjustable carrying-ring 41; also, if it is desired to loosen up the bushing 40 to permit of the easy rotation or turning thereof it is only necessary to screw up the carrier-ring 41, as will be obvious.

The construction described presents one way of providing a babbitted bearing for the end of the plug-shaft; but it is obvious that other forms of babbitted bearings as well as other forms of plain or antifriction bearings may be employed in carrying out this part of the invention.

A very important feature of the invention resides in the mounting of the driving-pulley 32 for rotation in a fixed plane relative to the endwise or longitudinal adjustment of the plug-shaft; also, to provide for the mounting of the pulley in such a manner that the same will be entirely relieved from any binding pressure or thrust exerted from opposite sides in either direction, or, in other words, to provide for absorbing any lateral thrust imposed upon the pulley. A further object in this connection is to so mount the pulley that the plug and plug-shaft may be entirely withdrawn from the engine or machine and the pulley will remain supported in an operative position, admitting of the ready removal and replacing of the belt as well as of the replacing of the plug-shaft without the necessity of disturbing any part of the bearing-stand or its appurtenances. To accomplish these desirable results, the driving-pulley 32 is not only constructed to slidably receive and rotate with the plug-shaft, but is designed to be mounted upon or otherwise have a swiveled connection with a fixed or stationary part of the bearing-stand, preferably upon the bearing-box 34 or an extension of the latter.

In the broad aspect of the invention it is obvious that irrespective of how the swiveled connection is provided between the pulley and the bearing 33 the function always remains the same—namely, to hold the pulley against lateral or axial movement in both directions.

In the preferable forms of the machine the bearing-box 34 is provided at the inner side thereof with an inwardly-projecting contracted supporting hanger or collar 44, which may be either an integral part of the box or consist of a separate casting rigidly united thereto, as may be found most convenient or desirable in the manufacture of the machine. In conjunction with the supporting-collar 44 of the bearing-box the hub 45 of the pulley, whether of the web or spoked type, is provided at one side of the radial center of the pulley with a lateral hanger member 46, which loosely overhangs the supporting-collar 44 of the bearing-box and is interiorly counterbored to provide a bearing-chamber or housing 47 for a suitable bearing which will not only provide a part of the interlocking rotatable or swiveled connection between the pulley and the fixed stationary bearing-box, but will also provide means for taking any lateral thrust of the pulley in either direction as might be occasioned by the thrust of the plug-shaft being communicated to the pulley during the operation of the engine. It is therefore preferable in the mounting of the pulley to provide a hanger therefor which is of the thrust-bearing type and capable of taking the said thrust of the pulley in either direction. In other words, a double-acting or duplex thrust-bearing is employed in the mounting of the pulley, and, referring to a preferred construction shown in Fig. 4 of the drawings, the double-acting thrust-bearing for the pulley-mounting is shown as consisting of a pair of loosely-mounted bearing-rings 48 and 49, respectively, which are arranged in parallel relation within the bearing-chamber or housing of the pulley-hub. One of these rings is in the form of a cup-ring to provide a race for a circular series of antifriction bearing-balls 50, and within the base of the cup-ring 48 is preferably fitted a wear plate or ring 51, constituting a hardened wear-surface for the balls to roll against, said other ring 49 preferably being hardened to constitute the opposing wearing-surface for the balls.

Figure 4:
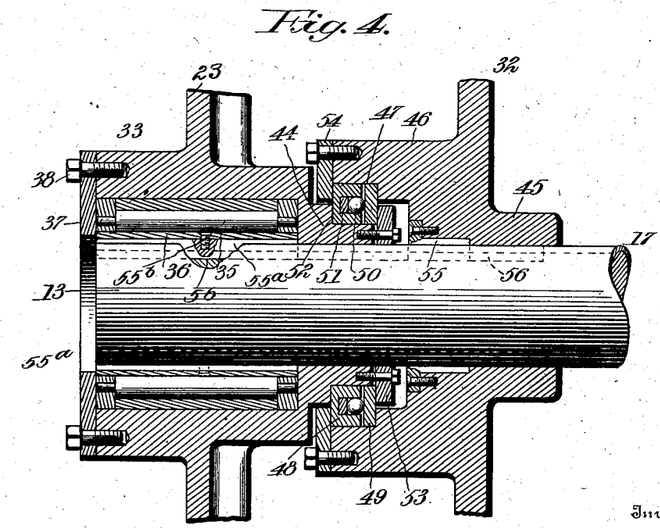
Fig. 4 is an enlarged detail sectional view showing the preferred construction of thrust-bearing hanger for the driving-pulley.

The bearing-rings 48 and 49 are mounted together upon the supporting-collar 44 of the bearing-box at one side of an abutment-shoulder 52, formed on the said collar, and the said bearing-rings and the interposed balls 50 are held in place as a complete bearing through the medium of overhanging retaining-rings 53 and 54, which are respectively secured to the inner end of the supporting-collar 44 to overlap the bearing-ring 49 and to the outer side of the pulley-hub to overhang the bearing-ring 48, as plainly shown in Fig. 4 of the drawings.

From the construction described it will be obvious that according to the direction of thrust which may be exerted laterally upon the driving-pulley the bearing-rings 48 and 49 will become alternately fast and loose, thus permitting of a duplex or double-acting thrust-bearing action in the individual bearing for the driving-pulley.

In connection with the mounting of the pulley in the manner described diametrically opposite keys or feathers 55 are secured in the hub of the pulley and project into and slidably engage with the longitudinal keyways or grooves 56, formed in diametrically opposite sides of the driven end of the plug-shaft. By reason of having the keys or feathers 55 secured to the hub of the pulley there are no projections or obstructions from the plug-shaft which prevent of the ready withdrawal and replacing of the plug in its shell whenever desired or required. Furthermore, in the construction shown the keys or feathers 55 may be made removable or replaceable through the chambered side of the pulley-hub.

At this point it is to be noted that the longitudinal keyways or grooves 56, formed in opposite sides of the driven end of the plug-shaft, not only receive the keys or feathers 55, carried by the hub of the pulley, but also the oppositely-disposed keys or feathers 55$^a$, secured in and carried by the wear-bushing 36, surrounding the end of the shaft, turning in the bearing within the bearing-box 34. The oppositely-disposed keys or feathers 55$^a$ preferably extend longitudinally the full length of the wear-bushing 36 and are held in seats provided therein through the medium of screws or equivalent fastening means 55$^b$; but it will of course be understood that the keys or feathers 55$^a$ may be fitted or secured to the bushing 36 in any approved manner so long as they provide slidable interlocking engagement between the plug-shaft and the bushing, whereby the latter is permitted to freely rotate with the shaft in the bearing, while at the same time permitting of longitudinal or endwise movement of the plug-shaft as the same may be adjusted in that direction.

In any form of the invention involving the employment of a wear-bushing upon the driven end of the plug-shaft which turns in the bearing there must necessarily be a keyed or feathered connection—as, for instance, in the babbitted form of bearing shown in Figs. 7 and 11 the wear-bushing 36$^a$ is illustrated as having fitted thereto the same keys or feathers 55$^a$, just referred to. The keyed or feathered connection between the driven end of the plug-shaft and the wear-bushing therefor materially assists in holding the shaft end true within its bearing and accurately guides the shaft into and out of the bearing.

Figure 5:
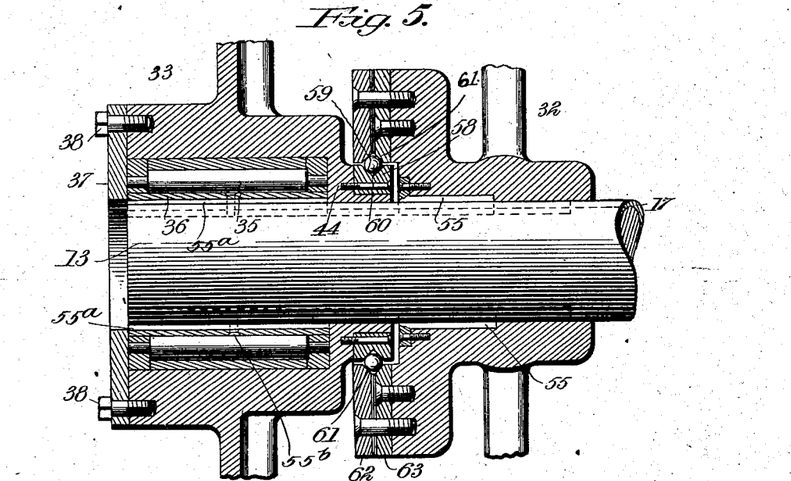
Figs. 5 and 6 are similar views showing modified types of thrust-bearing hangers which may be resorted to in the mounting of the pulley upon the bearing-stand.
Figure 6:
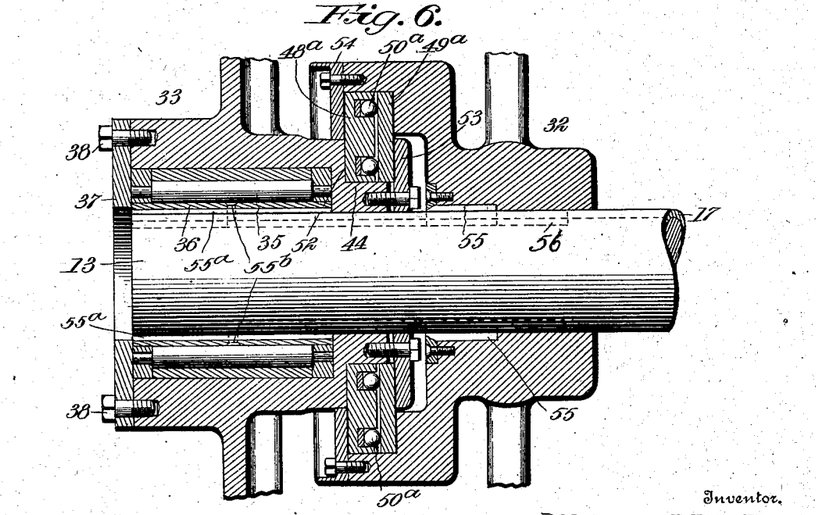

Many modifications may be resorted to in the thrust-bearing hanging of the driving-pulley. For instance, as shown in Fig. 6 of the drawings, instead of having but a single set of antifriction bearing-balls, as shown in Fig. 4, there may be employed a pair of widened bearing-rings 48ª and 49ª, with the said ring 48ª having formed therein a plurality of concentric races 57, which receive therein a set of antifriction-balls 50ª, coöperating with the opposing bearing-ring 49ª. This construction simply provides a more extended antifriction-bearing of the same type as shown in Fig. 4. A distinctively different form of double-acting thrust-bearing hanger for the driving-pulley is shown in Fig. 5. This modification involves the employment of a base bearing-ring 58, secured fast upon the supporting-collar 44 of the bearing-box and provided with a circumferential angular ball-race 59, accommodating therein a series of bearing-balls 60, which also turn in the complemental angular ball-race 61, formed by adjacent beveled edges of a pair of bearing plates or rings 62 and 63, respectively. These plates or rings 62 and 63 are arranged side by side, but are separately fastened to the adjacent hanger member 46 of the pulley-hub. By reason of the angular formation of the ball-races 59 and 61 it will be obvious that the construction necessarily provides for taking lateral thrust exerted upon the pulley in either direction, and thus accomplishing all the mechanical results of the other forms of bearing-hangers already described.

Figure 8:
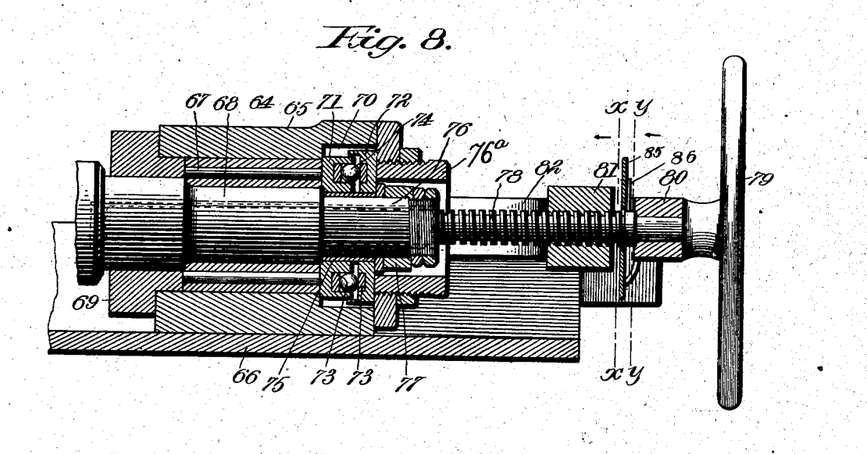
Fig. 8 is an enlarged detail sectional view showing a preferred form of duplex or double-acting thrust-bearing utilized in connection with the end of the plug-shaft opposite the driving-gear and adjustable through the medium of adjusting mechanism to effect the longitudinal or endwise adjustment of the plug within the shell.
Figure 9:
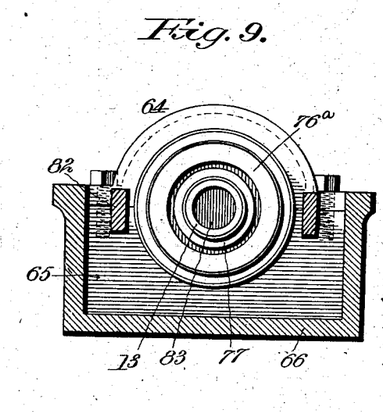
Fig. 9 is a detail end view of the adjustable double-acting thrust-bearing shown in Fig. 8 and illustrating said bearing arranged within the stationary guide therefor.

To effect a delicate and minute endwise or longitudinal adjustment of the Jordan plug and its shaft there is associated with the latter at the end opposite the driven end thereof an adjustable thrust-bearing 64. This thrust-bearing not only provides in connection with suitable adjusting mechanism for effecting the longitudinal adjustment referred to, but also serves to absorb the thrust of the plug-shaft when exerted in either direction. Any suitable type of double-acting or duplex thrust-bearing may be employed for this purpose; but a preferable construction is shown in the drawings, and essentially consists of a bearing box or case 65, slidably mounted in a horizontal stationary guide 66, suitably supported above the base B at one end of the plug-shell. The bearing-box 65 receives therein one end of the plug-shaft 13 and also provides a housing for a set of roller or equivalent antifriction bearings 67, which encircle a reduced journal portion 68 of the plug-shaft. The said roller or antifriction bearings 67 are usually held in place by means of a retaining-collar 69, arranged at one end of the box 65, and at the opposite end of the latter the same has formed therein a bearing-chamber 70, which receives the double-acting thrust-bearing proper. In the construction shown this double-acting thrust-bearing proper is substantially like the type of bearing shown in Fig. 4 of the drawings in connection with the pulley-mounting, and essentially consists of a pair of loosely-mounted bearing-rings 71 and 72, both carrying hardened wear-plates 73, and one of said rings—namely, the ring 71—being in cup form to provide a race for a set of antifriction bearing-balls 74, interposed between the two rings. The said rings 71 and 72 are preferably arranged on a shaft-bushing 75, fitted on the reduced terminal 76 of the plug-shaft beyond the journal portion 68 thereof. Also the said bearing-rings are designed to rest against opposite sides of the chamber 70, within which they are located, and according to the direction of thrust of the shaft become alternately fast and loose to provide for easing or absorbing the thrust in whichever direction it may be exerted. The rings constituting the double-acting thrust-bearing proper may be held within the bearing-chamber 70 through the medium of any suitable holding devices, such as the separate sets of nut-secured holding elements 76ª and 77. (Shown in Fig. 8 of the drawings.)

While many forms of adjusting devices may be associated with the plug-shaft to accomplish endwise or longitudinal adjustment thereof, an improved type of adjusting means is shown in the drawings, and essentially consists in the employment of a single adjusting-screw 78, carrying at its outer end a hand-wheel 79, and swiveled contiguous to its outer end in a bearing-bar 80 at one end of the horizontal stationary guide 66.

The threaded portion of the screw 78 turns in the nut 81 at the outer end of a yoke 82, rigid with and offset from the outer end of the bearing box or case 65, and to accommodate the inner end portion of the screw 78 the adjacent end of the plug-shaft is cored to provide a longitudinally-disposed pocket or axial bore 83. This longitudinally-disposed pocket or axial bore 83 accommodates the major portion of the adjusting-screw, and therefore permits the pressure of said screw to be exerted in a perfectly true axial line.

It is preferable in the carrying out of the invention to associate with the adjusting devices for the plug-shaft fastening or locking means for securing the plug against endwise movement and holding the same perfectly rigid, as far as such movement is concerned, after having once been properly adjusted or set through the medium of the said adjusting devices. A simple and practical expedient for effecting this result is illustrated in the drawings and consists in making the threaded nut 81 of the split type—that is, forming the same with a split portion 81ª, the slit of which is intersected by a threaded opening receiving a locking-screw 81ᵇ, having a hand-wheel 81ᶜ at its upper end. The locking-screw necessarily provides means whereby the split nut 81 may be tightened or bound upon the screw 78, so as to positively lock the same against rotation, and hence serving to hold the plug against endwise or longitudinal movement after having been once set. Other equivalent expedients could of course be resorted to to accomplish the same result.

Figure 13:
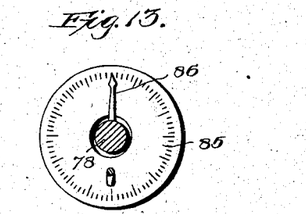
Fig. 13 is a detail sectional view on the line $y\,y$ of Fig. 8, showing a form of indicating device that may be utilized with the adjusting-screw for the plug-shaft.
Figure 14:
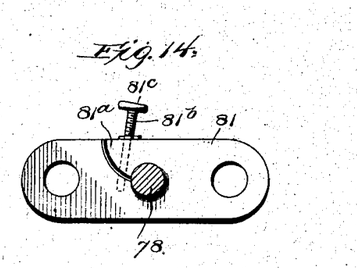
Fig. 14 is a similar view on the line $x\,x$ of Fig. 8, showing a form of fastening or locking device that may be utilized for locking the plug against endwise movement after having been set to its adjusted position.

The invention also has in view associating with the adjusting devices for the plug suitable indicator or indicating means which enables the operator to accurately determine the exact degree of adjustment of the plug, and which is especially useful, in the event of the plug having been removed, by admitting of the plug being screwed back into the shell and reset perfectly or accurately to its original position. A form of indicator securing these advantageous functions is plainly shown in Figs. 8 and 13 of the drawings, and essentially consists of a stationary graduated dial 85, conveniently supported in a fixed position upon the frame-guide 66 and arranged concentrically with relation to the adjusting-screw 78. The indicator also includes a swinging pointer or index-finger 86, carried by the screw 78 and playing over the graduated face of the dial 85. Any equivalent arrangement of the dial and the pointer or index-finger 86 may obviously be resorted to in carrying out this part of the invention.

It has already been pointed out that the driving-pulley 32 is not only constructed to slidably receive and rotate with the plug-shaft, but is also designed to be mounted for rotation upon a fixed or stationary support, whereby the said pulley will rotate in a fixed plane relative to the endwise or longitudinal adjustment of the plug-shaft. In some forms of the invention, as already described, the mounting or hanging of the pulley involves the employment of an antifriction-bearing so arranged as to receive and absorb any lateral thrust of the pulley in either direction. However, it should be understood that it is not absolutely essential or necessary to the successful carrying out of the invention that a bearing be employed in the mounting or hanging of the pulley. For instance, as suggested in Fig. 11 of the drawings, the feature of an antifriction-bearing may be entirely dispensed with in the mounting of the pulley and instead thereof a plain swiveled connection utilized with suitable oilers to provide for holding the pulley for rotation in a fixed plane independent of the longitudinal adjustment or movement of the plug-shaft.

As indicated in Fig. 11 of the drawings, the supporting hanger or collar 44 at the inner side of the bearing-box 34 may be provided with an annular hanger-ring 87, projecting from the periphery thereof and fitting in the holding-groove 47ª, provided in the chambered side of the hanger member 46 of the pulley-hub 45, one side of said holding-groove 47ª being formed by the detachable retaining-plate 88, which necessarily serves to hold the pulley-hub interlocked with the hanger-ring 87, located at the inner end of the bearing-box 34. The construction described provides an interlocked hanger or swiveled connection between the pulley-hub and the bearing-box 34, while at the same time not interfering with the free rotation of the pulley with the shaft keyed therein. Other forms of friction or antifriction hangers for the pulley or, in fact, any kind of swiveled connection either inside or outside of the bearing may obviously be resorted to in carrying out this part of the invention.

Inasmuch as the herein-described machine especially exemplifies the importance of combining with the longitudinally-adjustable plug-shaft a duplex or double-acting thrust-bearing for said shaft opposite the driven end thereof, the claims embodying that combination are made herein instead of in my other application aforesaid.

From the foregoing it is thought that the construction, operation, and many advantages of the herein-described improvements in Jordan or refining-engines will be readily apparent to those familiar with the art without further description, and it will also be understood that various changes in the form, proportion, and minor details of construction may be resorted to without departing from the spirit of the invention or sacrificing any of the advantages thereof.

Having thus described the invention, what is claimed, and desired to be secured by Letters Patent, is—

1. In a refining-engine of the class described, the combination with the shell, and the plug having the shaft, of a stationary support having a single bearing, and the driving-gear including a pulley slidably receiving the shaft and having an interlocked connection with the stationary support for rotation in a fixed plane.

2. In a refining-engine of the class described, the combination with the shell and the plug having the shaft, of a stationary support having a single bearing, and a driving-gear including a pulley having a direct feathered connection with the shaft and also held to rotate in a fixed plane upon the stationary support, said pulley having an interlocked connection with the latter.

3. In a refining-engine of the class described, the combination with the shell and the plug having the shaft, of a stationary support having a single bearing, and driving-gear including a driving-pulley rotatably interlocked with said support and also having a feathered connection with the shaft.

4. In a refining-engine of the class described, the combination with the shell and the plug having the shaft, of a stationary support arranged exterior to the shell and having a single bearing, and the driving-gear including a pulley having a direct feathered connection with the shaft, and also an antifriction interlocked swiveled connection with said support.

5. In a refining-engine of the class described, the combination with the shell and the plug having the shaft, of a stationary support arranged exterior to the shell and having a single bearing, and the driving-gear including a pulley having a thrust-bearing and having an interlocked swiveled connection with the stationary support, and also having a direct feathered connection with the shaft.

6. In a refining-engine, the combination with the shell and the plug having the shaft, of a stationary support arranged exterior to the shell and having a single bearing, and the driving-gear including a pulley mounted for a fixed rotation upon the stationary support and having an interlocked connection with the latter, said interlocked connection including a double-acting thrust-bearing.

7. In a refining-engine of the class described, the combination with the shell and the plug having the shaft, of a stationary support arranged exterior to the shell and having a single bearing, and the driving-pulley interlocked with the stationary support and carried by said stationary support for rotation in a fixed plane, and having a direct feathered connection with the plug-shaft, said pulley being arranged to permit of the complete withdrawal of the plug-shaft without disturbing its mounting upon the said support.

8. In a refining-engine of the class described, the combination with the shell, and the plug having the shaft, of a stationary support arranged exterior to the shell and having a single bearing, and the driving-pulley having a lateral interlocked swiveled connection with the said support with a belt-clearance space between itself and the adjacent wall of the shell, said pulley also having a direct feathered connection with the plug-shaft.

9. In a refining-engine of the class described, the combination with the shell and the rotating plug having the shaft, of a stationary support arranged beyond one end of the shell, and the driving-pulley having a side hanger member rotatably mounted directly upon the said support, said hanger member also carrying a thrust-bearing for the pulley and the latter having a direct feathered connection with the plug-shaft.

10. In a refining-engine of the class described, the combination with the shell and the rotating plug having the shaft, of a stationary support arranged beyond one end of the shell, a driving-pulley provided with a hanger member and having a direct feathered connection with the plug-shaft, an antifriction-bearing for the hanger member of the pulley, and means for effecting a rotatable interlocking swiveled connection between the hanger member and said stationary support through the medium of said bearing.

11. In a refining-engine of the class described, the combination with the shell and the rotating plug having the shaft, of a stationary support arranged beyond one end of the shell and provided with a supporting-collar, and the driving-pulley having a direct feathered connection with the shaft and provided at one side of its hub with a chambered hanger member, a double-acting thrust-bearing housed within the chamber of the hanger member and including the said supporting-collar, and retaining devices for the bearing carried respectively by the supporting-collar and the hanger member of the pulley.

12. In a refining-engine of the class described, the combination with the shell and the rotating plug having the shaft, of a stationary support arranged beyond one end of the shell and provided with a shouldered collar, a driving-pulley having a direct feathered connection with the plug-shaft and provided at one side with a chambered hanger member, a double-acting thrust-bearing essentially comprising a pair of loosely-mounted rings with interposed bearing-balls, the same being arranged within the chamber of the hanger member and over the said shouldered collar, and retaining-rings overhanging opposite sides of the said thrust-bearing and respectively secured to the hanger member of the pulley and the collar of said stationary support.

13. In a refining-engine of the class described, the combination with the shell and the rotating plug having the shaft, said shaft being provided in the driven portion thereof with keyways or grooves, of a stationary support arranged beyond one end of the shell, the driving-pulley carrying keys or feathers directly engaging the keyways of the plug-shaft and provided at one side with a chambered hanger member, a double-acting thrust-bearing housed within said hanger member, and retaining devices carried respectively by the pulley and the stationary support and coöperating with the said bearing to provide a rotary interlocked connection between the pulley and the said stationary support.

14. In a refining-engine of the class described, the combination with the shell and the rotating plug having the shaft, of a stationary support arranged exterior to the shell and having a bearing-box receiving the driven end of the plug-shaft, an antifriction-bearing within the bearing for said driven end of the shaft, and a driving-pulley having a direct feathered connection with the shaft and also rotatably interlocked with the said bearing-box for rotation in a fixed plane.

15. In a refining-engine of the class described the combination with the shell and the rotating plug having the shaft, of a bearing-stand arranged beyond one end of the shell and provided with a single antifriction-bearing for the extremity of the shaft at the driven end thereof, and the driving-pulley feathered directly to the shaft and having at one side of its radial center an antifriction interlocked swiveled connection directly upon the single bearing of the bearing-stand, said pulley providing between its opposite side and the adjacent end of the shaft a clearance-space for the belt.

16. In an engine of the class described, the combination with the shell and the rotating plug having the shaft, of a bearing-stand arranged at one end of the shell and having rigidly-connected inner and outer side members, the inner side member having a stuffing-box for the plug-shaft and the outer side member having an antifriction terminal bearing for the end of the shaft, and the driving-pulley arranged inside of the plane of the bearing-stand and mounted to rotate in a fixed plane upon the outer bearing carried by the stand, said pulley having a direct feathered connection with the plug-shaft.

17. In an engine of the class described, the combination with the shell and the plug-shaft, of the driving-pulley for the shaft, and a shiftable belt-accommodating bearing-stand.

18. In an engine of the class described, the combination with the shell and the plug-shaft, of the driving-pulley, and a shiftable belt-accommodating bearing-stand arranged for adjustment upon a horizontal axis and having a belt-clearance opening adapted to be presented in the direction of the belt-draw.

19. In an engine of the class described, the combination with the shell, the plug-shaft and the driving-pulley for the shaft, of a circularly adjustable or rotatable belt-stand swiveled at one side upon the adjacent end of the shell and carrying at the opposite side a terminal antifriction-bearing for the plug-shaft, said bearing-stand having a belt-clearance opening.

20. In an engine of the class described, the combination with the shell, the plug-shaft and the driving-pulley, of a circularly adjustable or rotatable bearing-stand arranged about the pulley and having a belt-clearance opening, said bearing-stand being provided at its inner side with the stuffing-box and having a swiveled engagement at such side with the adjacent end of the shell, the opposite or outer side of the bearing-stand being provided with a terminal antifriction-bearing for the plug-shaft.

21. In an engine of the class described, the combination with the shell, the plug-shaft and the driving-pulley for the latter, of a circularly adjustable or rotatable bearing-stand swiveled upon one end of the shell and having at the outer side thereof a single terminal bearing for the end of the shaft, said terminal bearing constituting a supporting member for the driving-pulley, said bearing-stand being provided with a belt-clearance opening for accommodating the belt, and fastening devices for holding the bearing-stand stationary in its adjusted position.

22. In an engine of the class described, the combination with the shell, the plug-shaft and the driving-pulley for the latter, of the base having stand-seats, a rotatable or shiftable bearing-stand having a swiveled connection at one end of the shell and provided at its outer side with the single terminal bearing for the plug-shaft, said bearing-stand essentially consisting of a circular skeleton framework having a side belt-clearance opening and also provided with a plurality of saddle-plates adapted to be individually fastened on the said stand-seats.

23. In an engine of the class described, the combination with the shell, the plug-shaft and the driving-pulley for the latter, of stationary stand-seats, and a circularly adjustable or shiftable bearing-stand essentially consisting of a circular skeleton framework having inner and outer side members and a plurality of cross-bars connecting said members and constituting saddle-plates adapted to be individually fastened to said seats, the inner side member having a stuffing-box and being swiveled to the shell and the outer side member having a single terminal bearing for one extremity of the plug-shaft.

24. In an engine of the class described, the combination with the shell and the rotating plug having the shaft, of driving-gear in operative connection with one end of the shaft for turning the same while permitting a longitudinal movement thereof, an adjustable bearing for the opposite end of the shaft, said bearing having an offstanding yoke carrying a nut and a suitably-mounted adjusting-screw arranged in line with the longitudinal axis of the plug-shaft and engaging said nut.

25. In an engine of the class described, the combination with the shell and the rotating plug, of the plug-shaft having at one end a longitudinally-cored pocket, driving-gear having an operative connection with one end of the shaft for turning the same while permitting a longitudinal movement thereof, an adjustable bearing for the opposite end of the shaft having an offstanding yoke carrying a nut, and an adjusting-screw mounted to turn in a suitable support and engaging the said nut, said screw being alined with the longitudinal axis of the shaft and extending into the said pocket of the latter.

26. In a refining-engine of the class described, the combination with the shell and the rotating plug having the shaft, of a stationary support arranged exterior to the shell and having a bearing-box receiving the driven end of the plug-shaft, a wear-bushing having a keyed or feathered connection with the driven end of the shaft and turning within the bearing-box, means for adjusting the plug-shaft longitudinally, and a driving-pulley rotatably interlocked with the stationary support and having a feathered connection with the shaft.

27. In an engine of the class described, the combination with the shell and the rotating plug having the shaft, of driving-gear in operative connection with one end of the shaft for turning the same while permitting a longitudinal movement thereof, an adjustable bearing for the opposite end of the shaft, said bearing having offset therefrom a yoke member having a split-nut element, a suitably-mounted adjusting-screw engaging said nut, and a locking-screw coöperating with the split nut.

28. In an engine of the class described, the combination with the shell and the plug having the shaft, of driving-gear in operative connection with the shaft and permitting a longitudinal movement thereof, adjusting means for the shaft, and an indicator coöperating with the said adjusting means to determine the set position of the plug.

29. In an engine of the class described, the combination with the shell and the plug having the shaft, of driving-gear in operative connection with the shaft and permitting a longitudinal movement thereof, and adjusting devices for the shaft including an adjusting-screw, and an indicator comprising a dial arranged concentrically to the adjusting-screw, and a pointer or index-finger carried by the said dial.

30. A machine of the character described comprising a shell, a longitudinally-adjustable grinding-shaft arranged therein, a driving-pulley which is slidably connected with said shaft, but held to turn therewith, a stationary bearing within which said shaft rotates, and a swiveled connection between said pulley and bearing for holding said pulley from axial movement in both directions, substantially as described.

31. A machine of the character described comprising a longitudinally-adjustable grinding-shaft having an axial bore in one end, an adjustable thrust-bearing in which the bored end of said shaft is journaled, and an adjusting-screw for said bearing which is partly arranged in the bore of said shaft, substantially as described.

32. A refining-engine comprising a shell, a grinding means, and a shaft for operating the same, means for adjusting said shaft longitudinally, comprising an adjustable combined thrust and journal bearing in which one end of said shaft is journaled, a swiveled adjusting-screw, a threaded connection between said bearing and screw, the journaled end portion of said shaft being axially bored and said adjusting-screw being partly located therein, the diameter of said bore being sufficient to permit said shaft to rotate independently of said screw, substantially as described.

In testimony whereof I affix my signature in presence of two witnesses.

MELVIN AMBROSE MILLS.

Witnesses:
WALTER COULSON,
HELEN A. SMITH.